(12) United States Patent
Lemarchand et al.

(10) Patent No.: US 9,689,314 B2
(45) Date of Patent: Jun. 27, 2017

(54) INTERMEDIATE CASING FOR TURBOMACHINE AND ACCESSORY GEARBOX DRIVE ASSEMBLY

(71) Applicant: SNECMA, Paris (FR)

(72) Inventors: Kevin Morgane Lemarchand, Paris (FR); Michel Gilbert Roland Brault, Quincy Sous Senart (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/899,761

(22) PCT Filed: Jun. 18, 2014

(86) PCT No.: PCT/FR2014/051514
§ 371 (c)(1),
(2) Date: Dec. 18, 2015

(87) PCT Pub. No.: WO2014/202905
PCT Pub. Date: Dec. 24, 2014

(65) Prior Publication Data
US 2016/0138476 A1   May 19, 2016

(30) Foreign Application Priority Data

Jun. 21, 2013 (FR) ...................... 13 55913

(51) Int. Cl.
*F02C 7/32* (2006.01)
*F01D 25/16* (2006.01)
*F01D 25/24* (2006.01)

(52) U.S. Cl.
CPC .............. *F02C 7/32* (2013.01); *F01D 25/162* (2013.01); *F01D 25/24* (2013.01); *F05D 2260/532* (2013.01); *Y02T 50/671* (2013.01)

(58) Field of Classification Search
CPC .......... F01D 15/10; F01D 15/12; F01D 25/18; F01D 25/24; F02C 7/06; F02C 7/32; F02C 7/36; F16H 57/0423
(Continued)

(56) References Cited

U.S. PATENT DOCUMENTS 2,978,869 A * 4/1961 Hiscock .................... F02C 7/32
60/791
3,799,476 A * 3/1974 Bouiller ................. B64D 41/00
244/53 R
(Continued)

FOREIGN PATENT DOCUMENTS

EP    2 123 883    11/2009
EP    2 239 440    10/2010
(Continued)

OTHER PUBLICATIONS

Written Opinion issued Jul. 31, 2014 in PCT/FR2014/051514 filed Jun. 18, 2014 (with English language translation).
(Continued)

*Primary Examiner* — Dwayne J White
*Assistant Examiner* — Su Htay
(74) *Attorney, Agent, or Firm* — Oblon, McClelland, Maier & Neustadt, L.L.P.

(57) ABSTRACT

A turbomachine intermediate casing including an internal hub designed to accept a turbomachine compressor shaft, an outer shell ring, and a plurality of radial arms connecting the hub and the shell ring, one of the arms including an internal housing of radial shaft for driving auxiliary machines, the casing further includes a bevel gearbox for the radial shaft arranged in the outer shell ring, the gearbox being formed as one with the outer shell ring, and the bevel gearbox includes a housing for gears between a radial shaft and an accessories
(Continued)

gearbox, the housing including an opening opening to the periphery of the outer shell ring.

10 Claims, 6 Drawing Sheets

(58) Field of Classification Search
USPC ............... 415/122.1, 124.1, 201, 213.1, 220; 60/802
See application file for complete search history.

(56) References Cited

U.S. PATENT DOCUMENTS

| | | | | |
|---|---|---|---|---|
| 4,525,995 A * | 7/1985 | Clark | ..................... | F01D 25/18 184/6.11 |
| 6,058,791 A * | 5/2000 | Brunet | ..................... | F02C 7/32 192/69.9 |
| 2006/0248900 A1 * | 11/2006 | Suciu | ..................... | F02C 7/32 60/802 |
| 2007/0241257 A1 * | 10/2007 | Eleftheriou | ........... | F01D 25/162 248/554 |
| 2007/0280819 A1 | 12/2007 | Eleftheriou et al. | | |
| 2008/0010970 A1 | 1/2008 | Eleftheriou et al. | | |
| 2008/0010996 A1 | 1/2008 | Eleftheriou et al. | | |
| 2008/0014083 A1 | 1/2008 | Eleftheriou et al. | | |
| 2008/0014084 A1 | 1/2008 | Eleftheriou et al. | | |
| 2009/0290976 A1 * | 11/2009 | Suciu | ..................... | F01D 25/18 415/122.1 |
| 2010/0242496 A1 | 9/2010 | Cass et al. | | |
| 2012/0159966 A1 | 6/2012 | Suciu et al. | | |
| 2013/0098058 A1 * | 4/2013 | Sheridan | ................... | F02C 7/32 60/783 |

FOREIGN PATENT DOCUMENTS

| | | |
|---|---|---|
| EP | 2 123 883 A3 | 1/2013 |
| WO | 2005 012696 | 2/2005 |

OTHER PUBLICATIONS

Search Report and Written Opinion issued Apr. 14, 2014 in French Patent Application No. 1355913.
International Search Report issued Jul. 31, 2014 in PCT/FR2014/051514 filed Jun. 18, 2014.

* cited by examiner

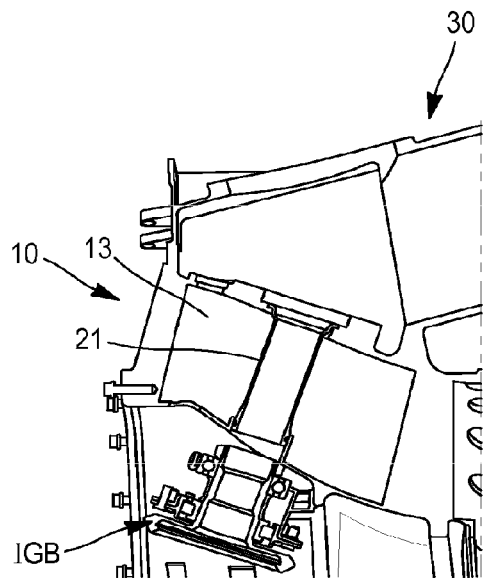
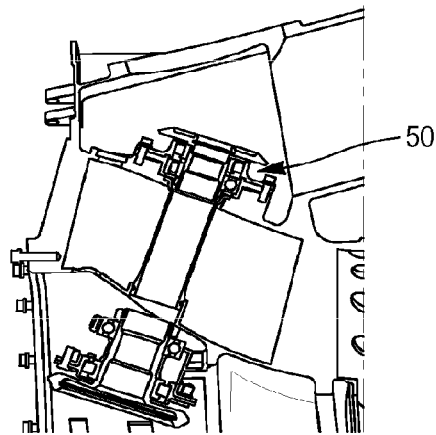
FIG. 5a  FIG. 5b
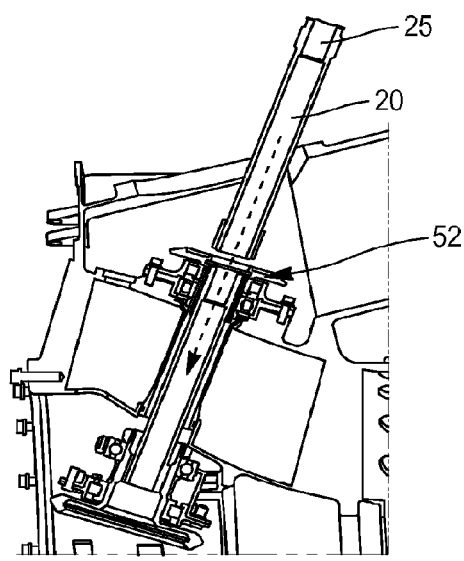
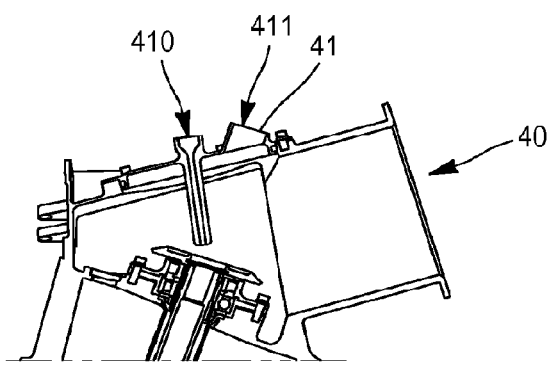
FIG. 5c  FIG. 5d

INTERMEDIATE CASING FOR TURBOMACHINE AND ACCESSORY GEARBOX DRIVE ASSEMBLY

FIELD OF THE INVENTION

The invention relates to an intermediate turbomachine casing and a drive assembly of auxiliary turbomachine machines comprising such a casing.

PRIOR ART

An example of a turbomachine is schematically illustrated in FIG. 1.

A turbomachine 1 typically comprises an air admission fan 2, a first compression section of air 3 admitted to the motor, called low-pressure section, and a second compression section 4 called high-pressure section. The air is compressed there before being admitted to a combustion chamber 5 and mixed with fuel to be burnt there.

Hot combustion gases originating from this combustion are then expanded in different turbine stages: a high-pressure turbine stage 6 located immediately downstream of the combustion chamber, and a low-pressure turbine stage 7 again expanding gases downstream.

A motor shaft 8 is driven by the two turbine stages and drives in rotation the low-pressure and high-pressure compressor stages.

The turbomachine further comprises a plurality of machine accessories combined in one accessory gearbox (AGB), these machines being such equipment as pumps, lubrication circuits, starter, etc., which are necessary for operation of the turbomachine, even though not used as propulsion.

Such a gearbox comprises a gear train which is driven in rotation by taking power at the motor shaft at the level of the intermediate casing, that is, the casing extending around the motor shaft at the level of the gap between the low-pressure compressor and the high-pressure compressor.

For this, a radial shaft is contained in the intermediate casing 10, which is meshed by the motor shaft by means of an intermediate bevel gear (Intermediate GearBox or IGB), and which in turn meshes the accessory gearbox via a bevel gear contained in an angle gearbox (or TGB for Transfer GearBox) mounted on the intermediate casing.

When maintenance has to be done on the radial shaft, it is necessary to pull out the angle gearbox or also even pull out the entire accessory machine support, which means long waits and therefore considerable maintenance costs.

Also, in some turbomachines, the accessory gearbox can be offset axially quite distant relative to the angle gearbox, which involves mounting a supplementary shaft between these two elements.

In terms of efforts for reducing noise caused by a turbomachine, developments are made to increase the diameters of the turbomachines by trying to reduce their axial length. It is therefore necessary to limit moving the accessory gearbox away relative to the angle gearbox.

Finally, it is necessary to reduce the mass of turbomachines to limit their fuel consumption and reduce flight costs.

PRESENTATION OF THE INVENTION

An aim of the invention is to rectify the above problems.

In particular, the aim of the invention is to propose a drive assembly of an accessory gearbox which accesses the radial shaft without having to disassemble the angle gearbox or the accessory gearbox.

Another aim of the invention is to reduce the mass and the axial bulk of a turbomachine.

In this respect, the aim of the invention is an intermediate turbomachine casing, comprising:
- an inner hub, adapted to receive a turbomachine compressor shaft,
- an outer ferrule, and
- a plurality of radial arms connecting the hub and the ferrule, one of the arms
- comprising an inner housing of a radial shaft for driving auxiliary machines,
- the casing being characterized in that it further comprises an angle gearbox of the radial shaft arranged in the outer ferrule, said gearbox being integrally formed with the outer ferrule, and the angle gearbox comprises a gear housing between a radial shaft and an accessory gearbox, said housing comprising an opening terminating in the periphery of the outer ferrule.

Advantageously, but optionally, the intermediate casing according to the invention can further comprise at least one of the following characteristics:
- the angle gearbox further comprises a linking arm with an accessory gearbox, said arm being hollow for receiving a gear train of the accessory gearbox, and the gear housing further comprising an opening for communication with said arm,
- the opening of the housing is arranged facing the radial arm comprising an inner housing of a radial shaft.

Another aim of the invention is a drive assembly of a turbomachine accessory gearbox, comprising an intermediate casing, a radial shaft extending in a radial arm of the casing, a gear assembly of the radial shaft to an accessory gearbox, mounted at one end of the radial shaft, and an angle gearbox of the radial shaft, the casing being in accordance with the preceding presentation, the angle gearbox being integrally formed in said casing.

Advantageously, but optionally, the drive assembly according to the invention can further comprise at least one of the following characteristics: the assembly further comprising a cover covering the opening of the housing of the casing at the periphery of the ferrule, said cover comprising a connection for admission of oil and a connection for evacuation of oil.
- the gear assembly comprises a bevel pinion comprising a hub adapted to receive the end of the radial shaft, and the gear assembly comprises an axial stop device of the radial shaft in the hub of the pinion.
- the hub of the bevel pinion comprises an inner circumferential groove, and the axial stop device comprises a ring arranged in the groove of the hub of the bevel pinion and projecting relative to the inner surface of the hub of the bevel pinion to form an axial stop of the radial shaft.
- the gear assembly further comprises two bearings extending around the hub of the pinion, and the drive assembly further comprises an oil feed distributor mounted in the radial shaft, in fluid communication with the bearings.

The invention also relates to a turbomachine comprising a motor shaft, an accessory gearbox, and a drive assembly of the accessory gearbox in accordance with the above description.

The invention finally relates to a method for mounting such an accessory gearbox drive assembly, comprising the steps consisting of:
- guiding a gear assembly to a casing angle gearbox through an opening in the outer wall of the ferrule of the casing and fixing said assembly to a wall of the angle gearbox, said wall separating the gearbox from a hollow axial arm of the casing,
- engaging a radial shaft in said arm of the casing through the hub of a pinion of the gear assembly,
- guiding an axial stop device of the radial shaft to the hub of the pinion, and
- closing the opening at the periphery of the outer ferrule by a cover.

The intermediate casing according to the invention has many advantages. First, as it integrates an angle gearbox, this reduces the mass of the turbomachine, since on the one hand the number of additional pieces to be attached to the casing to ensure operation of the accessory gearbox is reduced, and on the other hand this intermediate casing dispenses with the extra shaft connecting the angle gearboxes to the gear train of the accessory gearbox.

Furthermore, this casing allows easily accessing the radial arm in which the radial axis is arranged, especially passing through the opening on the outer wall of the ferrule of the casing.

The drive assembly of the accessory gearbox comprising such a casing, especially by way of this opening, also easily lubricates the bearings of the gear contained in the angle gearbox, and retrieves the oil.

Finally, assembly and disassembly of this drive assembly is easy, and this reduces the duration and cost of maintenance procedures.

DESCRIPTION OF FIGURES

Other characteristics, aims and advantages of the invention will emerge from the following description which is purely illustrative and non-limiting and which must be considered in conjunction with the appended drawings, wherein:

FIGS. 5a to 5d illustrate the installation steps of an engagement assembly,

DETAILED DESCRIPTION OF AT LEAST ONE EMBODIMENT OF THE INVENTION

Figure 2A:
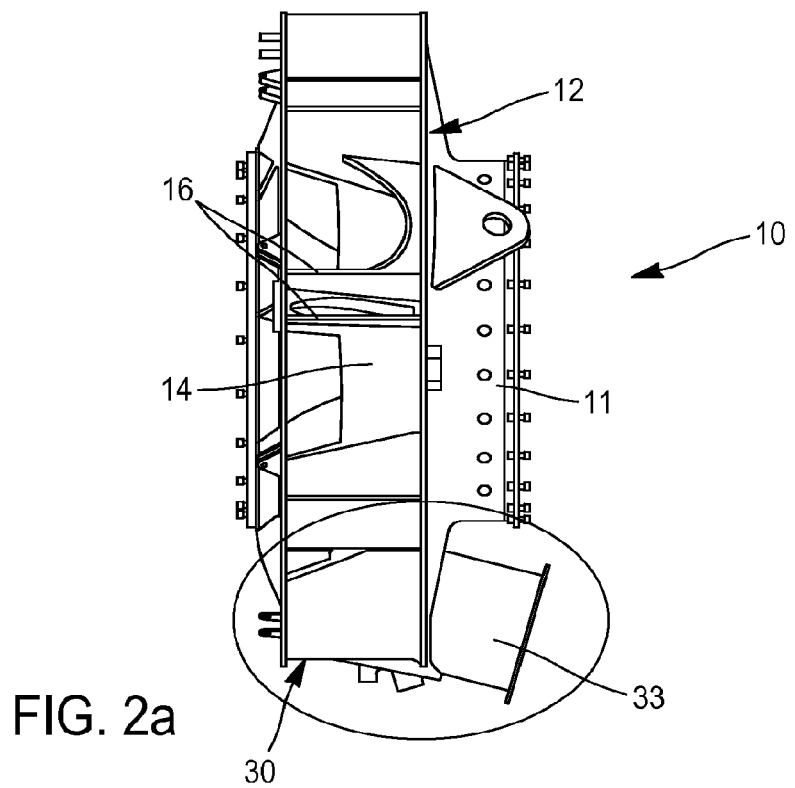
FIGS. 2a, 2b and 2c illustrate an intermediate casing according to an embodiment of the invention.
Figure 2B:
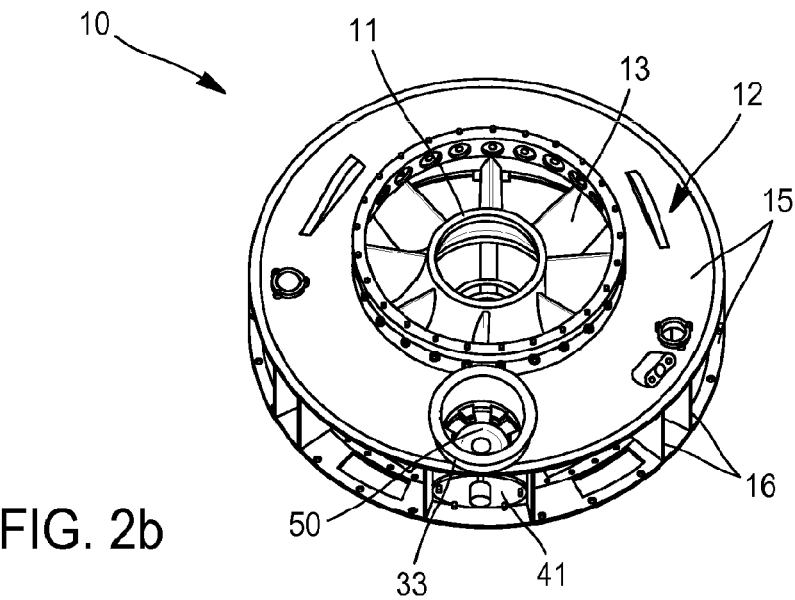
Figure 2C:
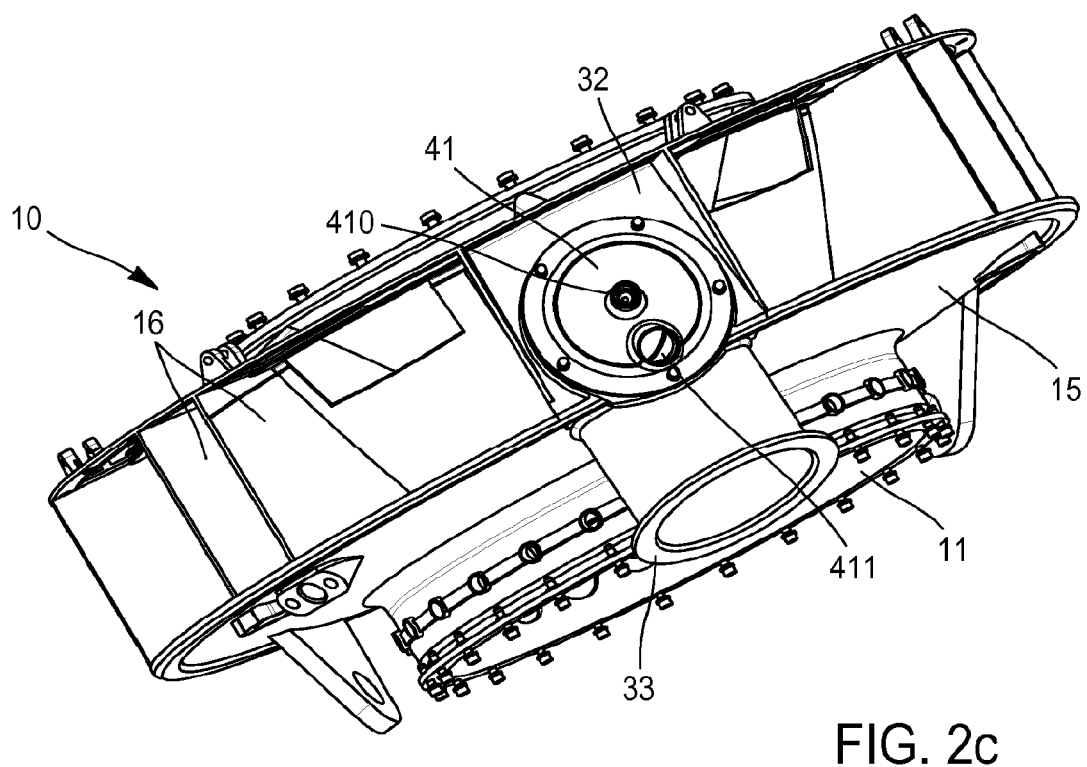

In reference to FIGS. 2a to 2c, these illustrate a turbomachine intermediate casing 10, that is, a part of the casing which encloses a section of the motor shaft of the turbomachine in between a low-pressure compressor and a high-pressure compressor. In this respect, the intermediate casing is an annular piece extending around and centred on the axis of the rotation shaft of the turbomachine.

This casing 10 comprises an inner hub 11 adapted to receive the motor shaft of the turbomachine, an outer ferrule 12, and a plurality of radial arms 13 extending between the hub and the ferrule.

The ferrule 12 comprises an inner wall 14 reconstituting the upper part of the vein of the primary flow of the turbomachine. The ferrule 12 further comprises two annular side walls 15 and a plurality of spacers.

The inner wall 14 extends circumferentially around the axis of the turbomachine, and is comprised between the two annular side walls 15 extending radially relative to the axis of the turbomachine, with a plurality of spacers 16 extending between the side walls and connecting them together.

The inner wall 14 connects together the spacers 16, which are distributed uniformly over the circumference of the ferrule, and if needed also connects the spacers to one or even to the two side walls 15.

The spacers 16 are arranged in a radial direction around the axis of the turbomachine and are located in the extension of the radial arms 13.

As shown in FIG. 2b, according to a particular embodiment, the spacers 16 are distributed in groups of two spacers, the groups of two spacers being distributed uniformly over the circumference of the ferrule, and in alignment with the radial arms such that the spacers prolong the radial arms 13 between the side walls 15 of the ferrule.

The assembly of the intermediate casing 10 comprising the hub 11, the radial arms 13, the spacers 16 and the inner 14 and side 15 walls of the ferrule, is foundry-moulded in a single piece.

At least one radial arm 13 is preferably hollow, that is, it comprises an inner housing which terminates advantageously on the inner side relative to the axis of the turbomachine through an opening made in the hub 11, and on the outer side through an opening made in the inner wall 14 of the ferrule so as to receive a radial shaft 20 and connect on the one hand to the motor shaft of the turbomachine and on the other hand to an angle gearbox 30. Advantageously, but optionally, all the radial arms 13 are hollow so as to lighten the structure and enable passage of tubes and cables.

Advantageously, the two spacers 16 arranged in the extension of the (or a) hollow radial arm 13 are spaced apart more than the other groups of two spacers to allow integration of a gear assembly as described hereinbelow.

Figures 3A, 3B:
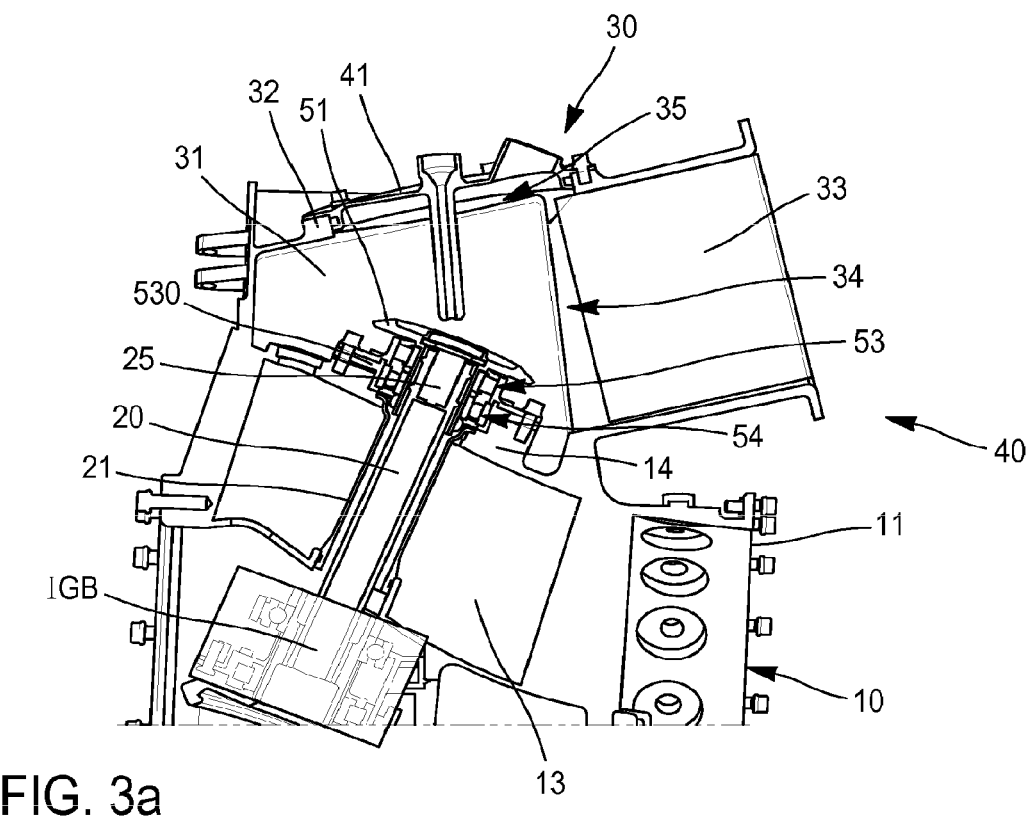
FIGS. 3a and 3b illustrate a view in partial section of an engagement assembly of an accessory gearbox comprising such an intermediate casing, FIG. 4 illustrate fixing a gear assembly of the engagement assembly on a wall of the angle gearbox.

As is evident in FIG. 3a, a radial shaft 20 extends in a radial arm 13 and terminates to one side in the hub where an intermediate bevel gear or IGB allows a first angle between the motor shaft and the radial shaft, and on the opposite side in an angle gearbox 30.

The radial shaft 20 is advantageously enclosed, in the radial arm 13, by a sealing sleeve 21.

Furthermore, the angle gearbox 30 is arranged in the outer ferrule 12 by being integrally formed—that is, moulded in a single piece—with said ferrule 12, to form an integral part of the casing 10.

The angle gearbox comprises a housing 31 formed in the outer ferrule, and which is axially delimited by the side walls 15, angularly by a group of two spacers 16, and radially both by the inner wall 14 of the ferrule and also by an outer wall 32 extending at the periphery of the ferrule, between the two spacers 16. Alternatively, the ferrule 12 comprises an outer wall extending over the entire circumference of the ferrule.

This housing is the seat of a bevel gear between the radial shaft 20 and a gear train (not illustrated) of an accessory gearbox. In this respect, and as seen in FIG. 2c, the angle gearbox 30 further comprises a linking arm 33 with an accessory gearbox which is hollow and extends according to an axis not parallel to the direction of the radial arm in which the radial shaft extends.

The housing 31 comprises an opening 34, made in one of the side walls of the ferrule, to communicate with the linking arm 33.

Also, the housing 31 comprises a second opening 35, made on the periphery of the ferrule, in the outer wall 32 of the latter. The opening 35 is arranged facing the hollow radial arm 13 in which the radial shaft 20 is arranged to have the radial shaft 20 pass through this opening to be positioned in the arm 13. As described hereinbelow, this opening also permits the supply and recovery of the lubricating oil of the bevel gear contained in the angle gearbox.

In reference to FIGS. 3a and 3b, a drive assembly 40 of an accessory gearbox, which comprises the casing 10 previously described, a radial shaft 20 arranged in a radial arm 13 of said casing, and a gear assembly 50, for the gearing of the radial shaft 20 on a gear train of an accessory gearbox will now be described.

The gear assembly 50 is mounted on the outer end of the radial shaft 20 and comprises especially a bevel pinion 51, comprising a hub 510 receiving the end of the radial shaft. The hub 510 of the pinion and the radial shaft are integral in rotation to ensure transmission of the movement of the shaft to the bevel pinion 51.

The gear assembly 51 further comprises an axial stop device 52 of the radial shaft in the hub 510 of the pinion.

According to a preferred embodiment, the axial stop device 52 comprises a circumferential groove 520 made on the inner surface of the hub 510, and a ring 521, dimensioned to be inserted in said groove such that once in position in the groove, the ring projects circumferentially relative to the inner surface of the hub 510. For this to occur, the ring 521 advantageously has a diameter equal to the diameter of the groove, and a radial dimension greater than the depth of the groove.

So, once the radial shaft 20 is mounted inside the hub 510 of the pinion, the ring can be positioned in the groove and the shaft then stops against the ring.

The gear assembly 50 further comprises two bearings 53, 54 for fastening the pinion in the housing 31, the bearings being mounted adjacent around the hub 510 such that they are comprised between the inner wall 14 of the ferrule and the pinion 51.

The outermost bearing 53 comprises a support 530 which is mounted on the inner wall of the housing by bolting or screwing, which also keeps the second bearing 54 between the wall and this first bearing 53.

The gear assembly further comprises a spacer 57 arranged between the bearings 53, 54, and an adjustment wedge 58 extending between the inner wall of the housing and the innermost bearing 54, these elements axially spacing the bearings to ensure good transmission of the forces of the pinion 51 to the casing 10.

The fact of having the two bearings between the adjustment wedge 58 and the pinion 51 enables assembly and disassembly of the gear assembly of the rest of the casing 10 without using an additional casing element which contains this assembly, representing a gain in terms of mass and ease of assembly for manufacture and maintenance, and therefore a drop in use and manufacturing costs of the drive assembly.

Figure 4:
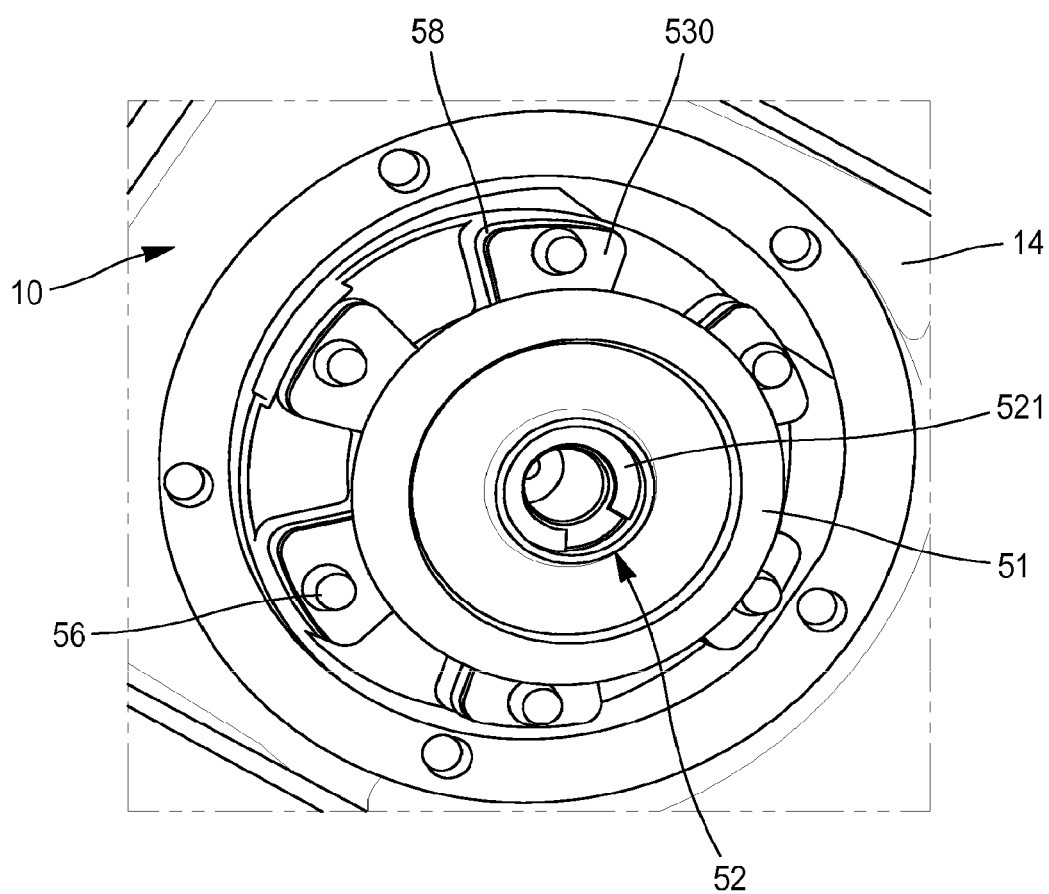
Figure 6:
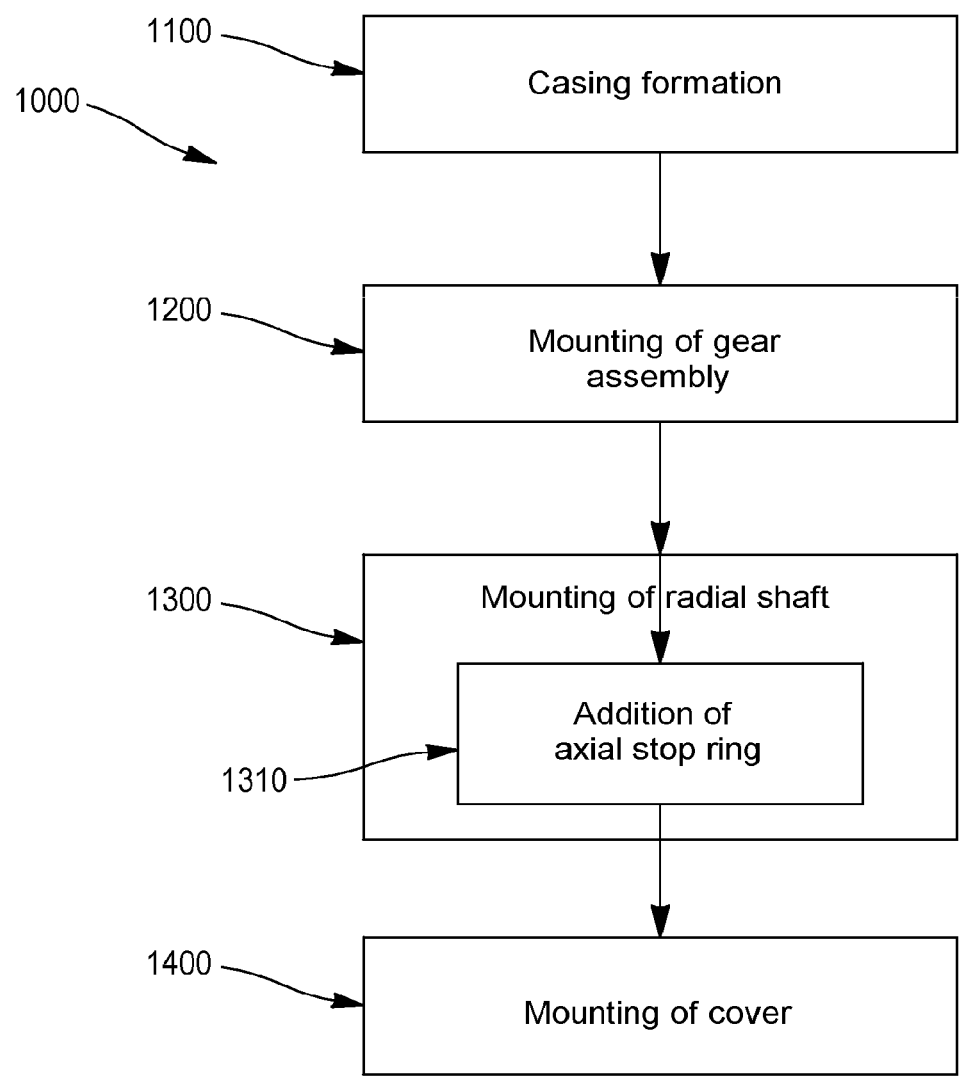
FIG. 6 illustrates in the form of a diagram the installation steps of the engagement assembly.

The support 530 of the bearing 53 and the adjustment wedge 58 extend advantageously circumferentially around the hub of the pinion so they can be screwed together to the wall by a plurality of screws 56 distributed preferably uniformly around the hub 510, as in FIG. 4.

The bearing 53 is a ball bearing, and the other 54 is a roller bearing. These two rollers are positioned to the same side of the bevel pinion (as opposed to a conventional solution where the bevel pinion is between the two bearings). This arrangement is allowed when the dynamic situation of the shaft is valid and its critical speed is high, this which is the case here since the shaft is short because on the one hand the angle gearbox is integrated into the casing, and on the other hand the accessory gearbox is placed on the casing without axial offset, that is, without the necessity of adding an extra shaft for movement transfer between this gearbox and the angle gearbox.

By unscrewing the screws 56 via the exterior (passing through the opening 35), it is possible to withdraw the gear assembly 50 with its bearings and its bearing supports in a single operation, without having to disassemble it.

The radial shaft 20 advantageously comprises an oil distributor 25, which is a cylindrical piece mounted inside the end of the shaft, this end in turn located in the hub of the pinion 51. Also the pinion, the distributor and the shaft are configured to enable circulation of oil between the distributor 25 and the bearing assemblies 53, 54.

So the gear assembly, which comprises the bearing assemblies 53, 54 mounted around the pinion 51 and the pinion itself, can be assembled prior to installing by fastening bearings and the wedge on the inner wall of the ferrule 12. As illustrated in FIG. 4, this installation is simple since it suffices to engage the screws 56 in the inner wall of the ferrule 12 through the support 530 of the bearing 53 and of the adjustment wedge 58.

As seen in FIGS. 3a and 3b, the engagement assembly 40 further comprises a cover 41 which is mounted on the ferrule 12 to close the opening 35 made at its periphery. Yet it can be pulled out to access the interior of the housing 31 for easy maintenance.

The cover 41 comprises an oil admission connection 410 and an oil evacuation connection 411, these two connections then being attached to branches of an oil circulation circuit.

The oil supply connection 410 further comprises a protuberance 412 extending into the interior of the housing 31 towards the bevel pinion 51, with injection of pressurised oil allowing the oil to enter the housing 31 as far as the pinion 51 which is now lubricated, and as far as the interior of its hub 510, in the oil distributor 25, which then distributes the oil by centrifugal effect in the bearing assemblies 53, 54 to ensure their lubrication.

The housing 31 constitutes a lubrication enclosure of the bevel gear contained in the angle gearbox.

Figure 1:
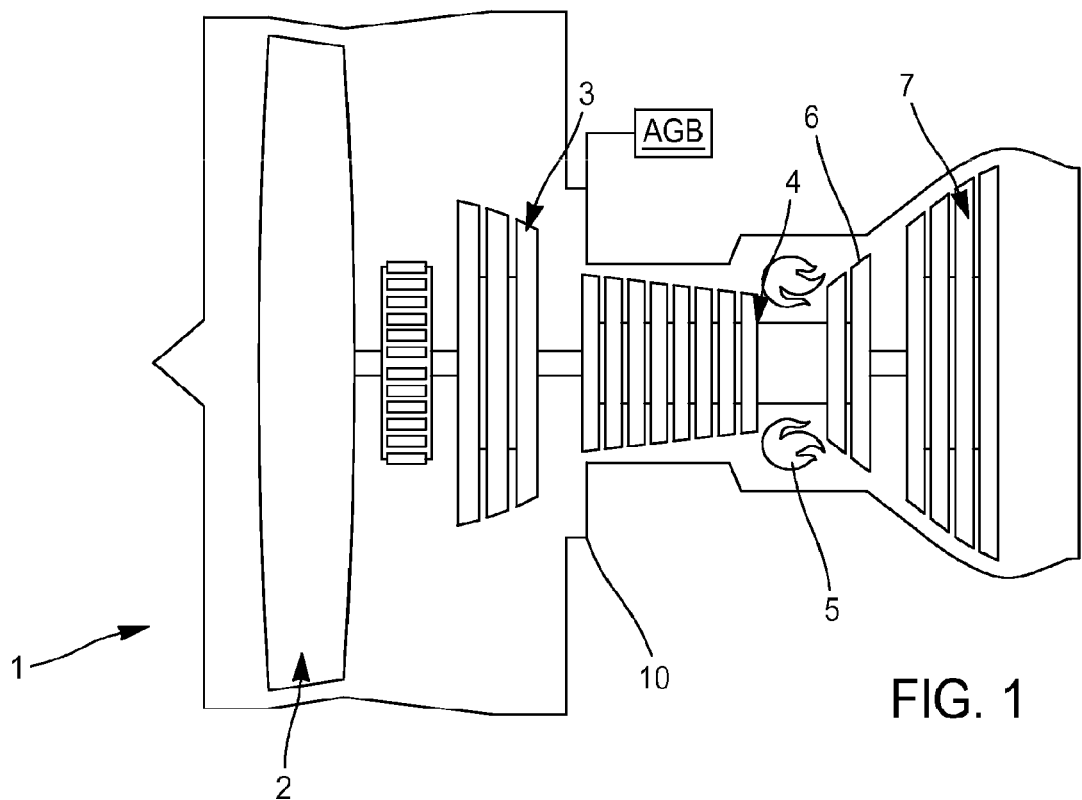
FIG. 1, already described, schematically illustrates a turbomachine in which the invention can be carried out.

Furthermore, as illustrated in FIG. 2a, when the drive assembly 40 is mounted in a turbomachine for example in accordance with FIG. 1, the casing is positioned such that the angle gearbox 30 is vertically above the motor shaft of the turbomachine, below the latter ("at 6 o'clock"). In this way, the opening 35 of the housing and the cover 41 is below the bevel gear between the radial shaft 20 and the accessory gearbox such that the oil used for lubrication of the gear assembly 50 can fall back via gravity to the base of the housing 31 and flow out of the housing via the oil evacuation connection 411 of the cover.

In reference to FIGS. 5a to 5d and FIG. 6, an assembly method 1000 of a drive assembly 40 will now be described.

During a first step 1100, a casing 10 comprising an angle gearbox 30 integrally formed in the ferrule of the casing is foundry-moulded.

Once the casing is made, as illustrated in FIG. 5a, an intermediate bevel gear IGB is fixed inside its central hub 11, this gear being adapted to mesh with a complementary gear of a turbomachine motor shaft, not illustrated in the figure.

During a step 1200, a gear assembly 50 of a radial shaft with an accessory gearbox (not illustrated in the figure) is guided through the opening 35 of the casing made at the periphery of the ferrule (in the outer wall 32). As illustrated in FIG. 5b, this assembly is fixed to the inner wall 14 of the ferrule 12, at the end of the radial arm 13 by means of a plurality of screws 56.

In reference to FIG. 5c, a radial shaft is then guided 1300 into the radial arm by having it pass through the opening 35, and in the hub 510 of the bevel pinion of the gear assembly. This radial shaft is engaged at its inner end with the intermediate bevel gear IGB and at its outer end with the hub 510 of the pinion 51.

Advantageously, an axial stop ring 521 of the radial shaft in the hub 510 is guided 1310 into a groove 520 of the hub 510 of the pinion provided for this purpose.

Finally, in reference to FIG. 5d, the opening 35 is then closed by means of the cover 41 during a step 1400.

The assembly of an accessory gearbox on this drive assembly can be carried out later by positioning a gear train of the gearbox in the housing 31, in meshing connection with the bevel pinion, and by fixing the accessory gearbox to the linking arm 33 of the angle gearbox.

The proposed solution integrates an angle gearbox in an intermediate casing by easily mounting a radial shaft and a gear assembly through an opening made in the gearbox. This facility produces a time gain in assembly or disassembly during maintenance, and therefore a gain in terms of manufacturing and upkeep costs.

Also, this compact installation eliminates extra pieces (such as for example the structure of the angle gearbox which was previously an extra piece attached to the casing) and therefore lightens the turbomachine.

The invention claimed is:

1. An intermediate turbomachine casing, comprising:
   an inner hub adapted to receive a turbomachine compressor shaft,
   an outer ferrule comprising an inner wall and an outer wall, the outer wall radially spaced apart from and extending around the inner wall, at the periphery of the outer ferrule, and
   a plurality of radial arms connecting the inner hub and the outer ferrule, one of the arms comprising an inner housing of a radial shaft for driving auxiliary machines,
   an angle gearbox of the radial shaft arranged in the outer ferrule, said gearbox being integrally formed with the outer ferrule, and the angle gearbox comprises a gear housing between the radial shaft and an accessory gearbox,
   wherein said gear housing comprises an opening provided in the outer wall of the outer ferrule.

2. The intermediate casing according to claim 1, wherein the angle gearbox further comprises a linking arm with the accessory gearbox, said linking arm being hollow to receive a gear train of the accessory gearbox, and the gear housing further comprising an opening for communication with said linking arm.

3. The intermediate casing according to claim 1, wherein the opening of the housing is arranged facing the radial arm comprising the inner housing of the radial shaft.

4. A drive assembly of a turbomachine accessory gearbox, comprising an intermediate casing, a radial shaft extending in a radial arm of the casing, a gear assembly of the radial shaft to an accessory gearbox, mounted at an end of the radial shaft, and an angle gearbox of the radial shaft,
   wherein the intermediate casing is a casing according to claim 1, the angle gearbox being integrally formed in said casing.

5. The drive assembly according to claim 4, further comprising a cover covering the opening of the housing on the periphery of the ferrule, said cover comprising an oil admission connection and an oil evacuation connection.

6. The drive assembly according to claim 4, wherein the gear assembly comprises a bevel pinion comprising a hub adapted to receive the end of the radial shaft, and the gear assembly comprises an axial stop device of the radial shaft in the hub of the pinion.

7. The drive assembly according to claim 6, wherein the hub of the bevel pinion comprises an inner circumferential groove, and the axial stop device comprises a ring arranged in the groove of the hub of the bevel pinion and projecting relative to the inner circumferential groove of the hub of the bevel pinion to form an axial stop of the radial shaft.

8. The drive assembly according to claim 6, wherein the gear assembly further comprises two bearings extending around the hub of the bevel pinion, and the drive assembly further comprises an oil supply distributor mounted in the radial shaft, in fluid communication with the bearings.

9. A turbomachine, comprising a motor shaft, an accessory gearbox, and a drive assembly of the accessory gearbox according to claim 4.

10. A method for mounting a drive assembly of an accessory gearbox according to claim 4, comprising:
    guiding a gear assembly in a casing angle gearbox through an opening in the outer wall of the ferrule of the casing, and fixing said gear assembly to a wall of the angle gearbox, said wall separating the gearbox from a hollow axial arm of the casing,
    engaging a radial shaft into said arm of the casing through the hub of a pinion of the gear assembly,
    guiding an axial stop device of the radial shaft into a hub of the pinion, and
    closing the opening at the periphery of the outer ferrule by a cover.

* * * * *